United States Patent
Lindekens et al.

(10) Patent No.: US 9,309,438 B2
(45) Date of Patent: *Apr. 12, 2016

(54) RADIATION CURABLE COMPOSITIONS

(75) Inventors: Luc Lindekens, Merchtem (BE); Hugues Van Den Bergen, Drogenbos (BE); Luc De Waele, Denderwindeke (BE); Stephan Peeters, Heverlee (BE)

(73) Assignee: ALLNEX BELGIUM SA, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/004,756

(22) PCT Filed: Mar. 30, 2012

(86) PCT No.: PCT/EP2012/055828
§ 371 (c)(1),
(2), (4) Date: Sep. 12, 2013

(87) PCT Pub. No.: WO2012/136593
PCT Pub. Date: Oct. 11, 2012

(65) Prior Publication Data
US 2014/0005332 A1 Jan. 2, 2014

(30) Foreign Application Priority Data

Apr. 5, 2011 (EP) .................................... 11161137
Apr. 5, 2011 (EP) .................................... 11161141

(51) Int. Cl.
*B01F 17/00* (2006.01)
*C08F 20/00* (2006.01)
*C09D 167/00* (2006.01)
*C09D 11/101* (2014.01)

(52) U.S. Cl.
CPC ............ *C09D 167/00* (2013.01); *C09D 11/101* (2013.01)

(58) Field of Classification Search
None
See application file for complete search history.

(56) References Cited

U.S. PATENT DOCUMENTS

| | | | | |
|---|---|---|---|---|
| 4,028,204 | A * | 6/1977 | Rosen et al. | 522/101 |
| 5,580,941 | A | 12/1996 | Krause et al. | |
| 5,783,616 | A | 7/1998 | Krause et al. | |
| 5,847,065 | A | 12/1998 | Krause et al. | |
| 5,854,191 | A | 12/1998 | Krause et al. | |
| 5,854,321 | A | 12/1998 | Krause et al. | |
| 5,917,031 | A | 6/1999 | Miura et al. | |
| 5,919,834 | A | 7/1999 | Downs et al. | |
| 6,069,187 | A | 5/2000 | Kusumoto et al. | |
| 6,914,120 | B2 * | 7/2005 | Germroth et al. | 528/300 |
| 7,250,209 | B2 | 7/2007 | Shibahara et al. | |
| 7,723,461 | B1 | 5/2010 | Wagener et al. | |
| 8,012,573 | B2 | 9/2011 | Kowata et al. | |
| 2002/0013482 | A1 | 1/2002 | Brader et al. | |
| 2002/0026028 | A1 | 2/2002 | Epple et al. | |
| 2008/0020961 | A1 | 1/2008 | Rodrigues et al. | |
| 2009/0018300 | A1 | 1/2009 | Bloom et al. | |
| 2010/0136347 | A1 | 6/2010 | Simons et al. | |
| 2011/0014139 | A1 | 1/2011 | Viala et al. | |
| 2011/0046225 | A1 | 2/2011 | Dalle Carbonare | |
| 2011/0092718 | A1 | 4/2011 | Enger et al. | |
| 2011/0163267 | A1 | 7/2011 | Goldfinger et al. | |
| 2012/0220676 | A1 | 8/2012 | Moens | |
| 2013/0144007 | A1 | 6/2013 | Zastrow et al. | |
| 2014/0073716 | A1 | 3/2014 | Cho et al. | |
| 2014/0249285 | A1 | 9/2014 | Palmese et al. | |

FOREIGN PATENT DOCUMENTS

| | | |
|---|---|---|
| CN | 1177008 | 3/1998 |
| CN | 1333303 | 1/2002 |
| CN | 101353546 | 1/2009 |
| CN | 101595158 | 12/2009 |
| DE | 10 2007 034 865 | 1/2009 |
| EP | 0 648 234 | 9/1999 |
| EP | 1 411 077 | 4/2004 |
| EP | 1 762 600 | 3/2007 |
| EP | 1 881 016 | 1/2008 |
| EP | 2 226 171 | 9/2010 |
| EP | 2 365 036 | 9/2011 |
| WO | 01/25288 | 4/2001 |
| WO | 01/27181 | 4/2001 |
| WO | 02/38688 | 5/2002 |
| WO | 03/078512 | 9/2003 |
| WO | 2005/085369 | 9/2005 |
| WO | 2006/102279 | 9/2006 |
| WO | 2007/120459 | 10/2007 |
| WO | 2008/000696 | 1/2008 |
| WO | 2008/004002 | 1/2008 |
| WO | 2008/015474 | 2/2008 |
| WO | 2009/013064 | 1/2009 |
| WO | 2009/115489 | 9/2009 |
| WO | 2009/153168 | 12/2009 |
| WO | 2011/004840 | 1/2011 |
| WO | 2011/019557 | 2/2011 |
| WO | 2011/048739 | 4/2011 |
| WO | 2011/048750 | 4/2011 |
| WO | 2011/058130 | 5/2011 |
| WO | 2011/092328 | 8/2011 |
| WO | 2011/128382 | 10/2011 |
| WO | 2013/066461 | 5/2013 |

OTHER PUBLICATIONS

International Search Report issued Aug. 29, 2013 in International (PCT) Application No. PCT/EP2013/056125.
International Search Report issued Jun. 20, 2013 in International (PCT) Application No. PCT/EP2013/056137.

* cited by examiner

*Primary Examiner* — Susannah Chung
*Assistant Examiner* — Robert T Butcher
(74) *Attorney, Agent, or Firm* — Wenderoth, Lind & Ponack, L.L.P.

(57) ABSTRACT

The present invention relates to a radiation curable composition comprising at least one (meth)acrylated compound compound (A); and at least one inert polyester (B) that is prepared from a (i) polyol component comprising at least one cyclic ether polyol and (ii) from a polyacid component. The present invention further relates to their preparation and uses.

14 Claims, No Drawings

RADIATION CURABLE COMPOSITIONS

The present invention relates to radiation curable compositions comprising inert resins that are suitable for use on various substrates, including plastic substrates; to their preparation and their uses.

BACKGROUND OF THE INVENTION

Radiation curable (meth)acrylated compounds may be produced commercially from petrochemical sources. The world's supply of petroleum is being depleted and eventually the demand for petrochemical derived products may outstrip the available supply. As a consequence, the market price of petroleum and petroleum derived products will increase making them less desirable.

Biology offers an attractive alternative for industrial manufacturers looking to reduce or replace their reliance on petroleum and petrochemical derived products. The replacement of petrochemicals and petrochemical derived products with products or feedstocks derived from biological resources (bioderived products) may offer many advantages. Products and feedstocks from biological sources are renewable. It may also be a response to the increasing demand for environmentally friendly products and to the price increase of petrochemical derived products.

Bioderived cyclic ether polyols obtained from various crops—we discovered—present a unique chemical structure that could fulfill the need for safer and more sustainable radiation curable resins. The non-aromatic cyclic structure of these derivatives provides high tensile modulus and high glass transition temperature. For instance, isosorbide di(meth)acrylates show unexpected high cure speeds combined with low viscosities and acceptable ink- or coating properties (WO 2011/048739 & WO 2011/048750). The applications requiring such performance are widespread in the industry.

There is however in particular a need for renewable compounds of oligomeric or polymeric nature that would be able to replace Bisphenol A. Today, an alternative for the reprotoxic Bisphenol A in e.g. packaging is a real market need.

In addition there is a wish to replace chlorinated products where possible as these represent an environmental and health occupational problem.

SUMMARY OF THE INVENTION

Against this background we now provide a radiation curable composition comprising at least one (meth)acrylated compound (A), and at least one inert polyester (B) that is prepared from a polyol component (i) comprising at least one cyclic ether polyol and from a polyacid component (ii). For optional other components or compounds, see infra.

The use of inert resins (B) of the invention may present one or more of the following advantages:
They are believed to be non-toxic,
they permit to achieve a fast and good curing,
they may have a good solubility with other components of a UV formulation (e.g. with acrylates),
they may have low viscosity,
they may have glass transition temperatures within acceptable range,
they may have low yellowing,
they may present some resistance to oxygen inhibition,
they permit to make radiation curable resins with a high renewable content,
they can be used in a primer for difficult substrates like metal and plastics,
they can be used as adhesion promoter in inks.

Compositions of the may present one or more of the following advantages:
they allow to obtain acceptable hardness,
they can be used in food packaging due to their very low migration properties,
they may have very good flow properties,
they have high UV reactivity,
they may have low viscosity,
they may have low yellowing,
they may have good mechanical properties once cured (e.g. good scratch resistance),
they are highly suitable for the making of inks and varnishes,
they may exhibit improved adhesion on plastics,
they can be used as primer on difficult substrates like e.g. metal and plastics,
they can be used as adhesion promoter in inks,
they can be used for the making of polymer matrixes of composite materials.

Advantages for the end-user include:
a safer solution due to the possibility to avoid of chlorine,
a better performing coating,
a higher renewable content.

DETAILED DESCRIPTION OF THE INVENTION

A first aspect of the invention concerns a radiation curable composition comprising at least one (meth)acrylated compound (A), and at least one inert polyester (B) that is prepared from a polyol component (i) comprising at least one cyclic ether polyol (i') and from a polyacid component (ii).

By an "inert resin" is meant a resin that does not take part in the polymerization process. Such resins contain few or no curable reactive groups. "Curable reactive groups" are those capable of participating in the cure reaction that takes place when the radiation curable composition of the present invention is exposed to energy radiation, such as UV radiation, electron beam and/or actinic radiation. Due to imperfections in manufacture or to degradation on storage, resins that are considered essentially free of reactive groups may actually have a small number of reactive groups. Preferred are resins with 0.1 or fewer equivalents of curable reactive groups per kilogram; more preferred is 0.01 or fewer; even more preferred is 0.003 or fewer; still more preferred is 0.001 or fewer; and most preferred is none.

Some common reactive groups that are used in radiation curable compositions are double bonds in the form of e.g. (meth)acrylic groups and/or vinyl groups. Consequently, resins containing (meth)acrylic and/or vinyl groups in large amounts do not qualify as inert resins in the present invention. However, double bonds contained in aromatic rings are known to generally be inert during radiation curing. By "(meth)acrylic groups" is meant acrylic groups, methacrylic groups, and mixtures thereof.

Inert resins are well known in the art and have been described in e.g. WO2002/38688, WO2005/085369, WO2008/015474, WO2008/004002, EP1411077 & US5919834.

Inert polyesters (B) that are used in the present invention can be produced in any way known in the art, though usually they are obtained via a polycondensation reaction. Compounds (B) of the invention can be prepared via a direct esterification reaction, possibly via a one-pot reaction. Typically polyesters (B) of the invention are prepared from (i) a polyol component, (ii) a polyacid component, and (iii), optionally, from one or more monocarboxylic or monohydroxy compounds (see X1 and X2 infra), wherein the polyol component comprises one or more cyclic ether polyols (i'). Optionally, polyesters (B) may further contain one or more moieties selected from the group consisting of (poly)caprolactone-containing moieties (iva), (poly)lactide- and/or (poly)glycolide-containing moieties (ivb), and moieties providing alkylene oxide groups containing from 2 to 4 carbon atoms (ivc).

By "moieties" is meant building blocks or monomeric units.

By a "(poly)caprolactone-containing moiety" is meant to designate a moiety containing one or more caprolactone units and/or one or more polycaprolactone units. Highly suitable are moieties (iva) that comprise at least one portion represented by Formula (1):

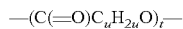

wherein u is an integer of from 2 to 5, preferably from 3 to 5; and t is an integer of from 1 to 10, preferably from 1 to 5, and most typically from 1 to 3. Moieties (iva)) are typically selected from (poly)δ-butyrolactone moieties, (poly)ε-valerolactone moieties and/or (poly)ε-caprolactone moieties. Preferred are (poly)ε-caprolactone moieties and more in particular poly-ε-caprolactone moieties. Often t is then 1 or 2.

By a "(poly)lactide-containing moiety" is meant to designate a moiety containing one or more polylactide units and/or one or more lactide units. By a "(poly)glycolide-containing moiety" is meant to designate a moiety containing one or more polyglycolide units and/or one or more glycolide units. Typically moieties (ivb) comprise at least one portion represented by Formula (2):

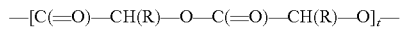

wherein t' is an integer from 1 to 10, and wherein each of R is selected from —H or —CH$_3$. Typically t' is an integer from 1 to 5, more typically from 2 to 4. Typically R is —CH$_3$. The lactide can be a L-, meso- and/or D-lactide.

Examples of moieties (ivc) providing alkylene oxide groups containing from 2 to 4 carbon groups are moieties derived from ethylene oxide, propylene oxide and/or butylene oxide. Preferred are moieties derived from ethylene oxide and/or propylene oxide.

In an embodiment of the invention one or more of the polyols used to prepare polyesters (B) of the invention may be modified to contain one or more of the above moieties (iva) through (ivc).

Preferred in the context of the invention though are polyesters (B) that do not comprise any of the moieties (iva) through (ivc).

Typically polyesters (B) of the invention are prepared by reacting compounds (i), (ii) and where present (iii) and/or (iv), preferably under anhydrous conditions, and preferably at a temperature between 120° C. and 220° C., more preferably between 150° C. and 200° C., until the reaction is substantially complete. The reaction may be facilitated by the addition of from 5 to 40%, preferably from 10 to 25%, by weight, of a solvent in order to reduce the viscosity of the pre-polymer. The solvent is preferably heptane, hexane or toluene. During this process, it is common to use catalysts to accelerate esterification reactions. Typical catalysts are strong acids like alkyl- and/or aryl sulphonic acids that are typically used in concentrations ranging from about 0.1 to about 2 wt %, or organo metal catalysts that are typically used in concentrations ranging from 0.01 to 0.1 wt %, relative to the total weight of compounds (B). Optional typical inhibitors are phenolic antioxidants like hydroquinone, methylether hydroquinone and the like, which are typically used in concentrations ranging from about 0.01 to about 0.5 wt %, relative to the total weight of compounds (B).

By "polyols" is meant to designate organic compounds bearing two or more hydroxyl groups. Diols are often preferred.

Cyclic ether polyols (i') are compounds containing at least one cyclic ether group and at least two hydroxyl groups. Preferred are bioderived cyclic ether polyols. Bioderived cyclic ether polyols are cyclic ether polyols derived from or synthesized by a renewable biological feedstock, such as, for example, agricultural, forestry, plant, bacterial or animal feedstock.

Examples of suitable cyclic ether polyols are e.g. anhydrohexitols. Anhydrohexitols are obtained by dehydration of hexitols like sorbitol (glucitol), mannitol, iditol, which are produced by reducing the carbonyl group of hexoses like glucose, mannose, idose that are typically derived from several biological feedstocks like wheat, corn, cellulose.

The double dehydration results in dianhydrohexitols. Usually the anhydrohexitol is a dianhydrohexitol like dianhydromannitol, dianhydrosorbitol, dianhydroiditol and mixtures thereof. The dianhydrohexitol preferably is a dianhydrosorbitol, more in particular is isosorbide. A few companies have specialized in the production of dianhydrohextols like isosorbide, isomannide and isoidide.

Preferably the polyol component used to prepare the polyester (B) comprises from 5 to 100% by weight (wt %) of one or more cyclic ether polyols (i') and, optionally, from 0 to 95 wt % of other suitable polyols (ii'). Typically this polyol component comprises at least 10 wt %, often at least 20 wt %, usually at least 30 wt %, more typically at least 40 wt % of one or more cylic ether polyols (i'), relative to the total weight of the polyol component.

Optionally one or more other polyols (ii') different from a cyclic ether polyol, may be used to prepare polyesters (B) of the invention. The amount of other polyols (ii') typically varies from 0 to 95% by weight (wt %), relative to the total weight of the polyol component. Typically this amount is at most 90 wt %, usually at most 80 wt %. Often this amount is at most 70 wt %, more often at most 60 wt %.

By other polyols (ii') is meant to designate in particular polyols that are different from a dianhydrohexitol as specified above, and more in particular polyols that are different from a dianhydrosorbitol like isosorbide.

Examples of polyols (ii') that may be used in the context of the present invention include but are not limited to (poly) ethylene glycols (like for instance ethylene glycol, diethylene glycol and triethylene glycol); (poly)propylene glycols (like for instance propylene glycol, dipropylene glycol and tripropylene glycol); 1,3-propanediol (neopentylglycol); 2-methyl-1,3-propanediol (MPD); 2-ethyl-2-butyl-1,3-propanediol; 1-ethyl-2-methyl-1,3-propanediol; 2-ethyl-2-methyl-1,3-propanediol; 1,3-butylene glycol; 1,4-butanediol; 2,3-butanediol; 2-butyl-2-ethyl-1,3 propanediol (BEPD); pentanediol; 2-methyl-2-ethyl-1,3-propane diol; 1,3-pentane diol; 2,2,4-trimethyl-1,3-pentane diol; hexyleneglycol; 1,6-hexanediol; 1,4-cyclohexanediol; 1,4-cyclohexanedimethanol; 3-hydroxy-2,2-dimethylpropyl 3-hydroxy-2,2-dimethyl-propanoate (hydroxylpivalyl hydroxypivalate (HPHP); the hydroxypivalate of neopentyl glycol); 2,2,4-trimethyl-1,3-pentanediol (TMPD); hydrogenated Bisphenol A; 3(4),8(9)-bis-(hydroxymethyl)-tricyclo-[5.2.1.02,6]decane; trimethylolpropane; pentaerythritol; ethoxylated and/or propoxylated forms of any of these (such as for instance propoxylated glycerol); and mixtures thereof (of any of the above). Often the polyols (ii') are diols. Examples of polyols (ii') of higher functionality that may be used in the context of the invention include but are not limited to: polyol R3540 from Perstorp. A more extensive list of other suitable polyols (ii') is provided in Table 1:

TABLE 1

| | Functionality | Hydroxy number (mg KOH/g) | Molecular weight (g/mol) | Viscosity (mPas, 23° C.) |
|---|---|---|---|---|
| Polyol R2395 | 2 | 395 | 276 | 350 |
| Polyol R 2490 | 2 | 490 | 220 | 170 |
| Polyol 3165 | 3 | 165 | 1014 | 350 |
| Polyol 3380 | 3 | 380 | 444 | 360 |
| Polyol 3610 | 3 | 610 | 275 | 700 |
| Polyol 3611 | 3 | 611 | 275 | 700 |
| Polyol 3940 | 3 | 940 | 179 | 4000 |
| Polyol 3990 | 3 | 990 | 170 | 4500 |
| Polyol R3215 | 3 | 215 | 795 | 340 |
| Polyol R3430 | 3 | 430 | 398 | 400 |
| Polyol R3530 | 3 | 530 | 308 | 2000 |
| Polyol R3540 | 3 | 540 | 311 | 550 |
| Polyol R3600 | 3 | 600 | 275 | 700 |
| Polyol 4290 | 4 | 290 | 797 | 450 |
| Polyol 4360 | 4 | 360 | 629 | 1300 |
| Polyol 4525 | 4 | 525 | 426 | 2600 |
| Polyol 4640 | 4 | 640 | 355 | 1100 |
| Polyol 4800 | 4 | 800 | 282 | 2200 |
| Polyol R4630 | 4 | 630 | 350 | 1500 |
| Polyol 4631 | 4 | 631 | 356 | 1500 |
| Polyol R6405 | 6 | 405 | 827 | 1900 |

Preferred polyols (ii') are propoxylated and/or ethoxylated glycerol, trimethylolpropane, polyol R3540 from Perstorp, pentaerythritol (such as PP50 from Perstorp), hydrogenated bisphenol A, ethylene glycol, diethylene glycol, neopentylglycol, as well as mixtures of any of these.

Particularly preferred are ethylene glycol, diethylene glycol, hydrogenated bisphenol A and/or neopentylglycol.

In an embodiment of the invention the polyol component (i) comprises one or more cyclic ether polyols (i') as defined above, and further at least one other polyol (ii') selected from ethylene glycol, diethylene glycol, hydrogenated bisphenol A and/or neopentylgycol.

In an embodiment of the invention the polyol component (i) comprises one or more cyclic ether polyols (i') as defined above, and further at least one other polyol (ii') selected from ethylene glycol, diethylene glycol and/or hydrogenated bisphenol A. Optionally this polyol component (i) may further comprise neopentylglycol. An advantage of neopentyl glycol is that it can improve adhesion on plastics.

In a particular embodiment of the invention, the amount of cyclic ether polyols (in casu dianhydrohexitols like isosorbide) is at least 5 wt %, more in particular at least 10 wt %, even more in particular at least 20 w %, up to 99.9 wt %, more typically up to 95 wt %, relative to the total weight of the polyol component. Typically the cyclic ether polyol is a dianhydrohexitol, more in particular a dianhydrosorbitol, most in particular isosorbide.

The polyacid component used to prepare compounds (B) of the invention can contain one or more "polyacids". By "polyacids" is meant to designate organic compounds bearing two or more carboxylic acid groups. The corresponding anhydrides or a suitable corresponding dialkylester of the polyacid may also be used. When dialkylesters are used at all, dimethylesters and/or diethylesters are preferred. Preferred polyacids are diacids (i.e., polycarboxylic acids with two carboxylic acid groups per molecule).

In the practice of the present invention, the polyacid may be an anhydride.

When inert polyesters (B) are prepared via transesterification, the polyacid is substituted by a polyacid dialkyl ester (like a phthalic acid dialkylester). In general the alkyl chains of this ester have from 1 to 20, preferably from 1 to 8, more preferably from 1 to 4 carbon atoms.

Dimethylesters and/or diethylesters are usually preferred. Preferably however the inert polyester (B) is obtained via an esterificiation reaction.

Preferably one uses polyacids selected from saturated and/or aromatic polyacids. Double bonds contained in aromatic rings are known to generally be inert during radiation curing (see above). Examples of polyacids that may be used to prepare polyesters (B) of the invention include but are not limited to phthalic acid; phthalic anhydride; chlorendic acid; chlorendic anhydride; succinic acid; adipic acid; oxalic acid; glutaric acid; pimelic acid; malonic acid; butanedioic acid; glutaric acid; suberic acid; azelaic acid; sebacic acid; 1,12-dodecanedioic acid; succinic anhydride; trimellitic anhydride; pyromellitic dianhydride; 1,4-cyclohexane dicarboxylic acid (CHDA); 1,3-cyclohexanedicarboxylic acid; 1,2-cyclohexanedicarboxylic acid; 1,4-cyclohexane dimethylcarboxylic acid; citric acid; tartaric acid, trimellitic acid; pyromellitic acid; and dimer diacids such as Empol® 1018 or Pripol® 1013; and mixtures thereof. Also terephthalic acid and/or isophthalic acid may be used.

Particulary suited are: phthalic acid; phthalic anhydride; isophtalic acid; terephtalic acid; adipic acid; oxalic acid; glutaric acid; malonic acid; butanedioic acid; glutaric acid; 1,4-cyclohexane dicarboxylic acid; 1,4-cyclohexane dimethylcarboxylic acid; and mixtures thereof.

Preferred are phthalic acid; phthalic anhydride; isophtalic acid; terephtalic acid; oxalic acid; malonic acid; and mixtures thereof. Also these compounds may be substituted by their corresponding dialkylester if the inert polyester (B) is prepared via transesterification, with dimethylesters and diethylesters being preferred.

In an embodiment of the invention the polyacid component used to prepare the polyester comprises phthalic acid and/or phthalic anhydride and, optionally, one or more other suitable polyacids (ii').

Typically the polyacid component comprises from 1 to 100 wt % of phthalic acid and/or phthalic anhydride; and, optionally, from 0 to 99 wt % of other suitable polyacids (ii'). More typically the polyacid component comprises from 5 to 100 wt % of phthalic acid and/or phthalic anhydride; and, optionally, from 0 to 95 wt % of other suitable polyacids (ii'). By "other polyacids" is then meant polyacids different from phthalic acid and from phthalic anhydride.

In a preferred embodiment of the invention the polyacid component comprises from 20 to 100 wt % of phthalic anhydride; and, optionally, from 0 to 80 wt % of other suitable polyacids (ii'). By "other polyacids" is then meant polyacids different from phthalic anhydride. Preferably the other suitable polyacids (ii') are mainly aliphatic polyacids.

Typically the amount of aromatic polyacids (ii') used is at most 50 wt % and most preferably at most 30 wt %, relative to the total weight of polyacids used. Typically the total amount of terephthalic acid plus isophthalic acid is at most 20 wt %, preferably at most 10 wt %, relative to the total amount of polyacids used to prepare polyesters (B) of the invention. In a particular embodiment of the invention no terephthalic or isophthalic acid are used.

Though not recommended to use, low amounts of unsaturated polyacids like alpha, beta-unsaturated polyacids may be tolerated, as long as the resulting polyester is still an inert polyester. Preferably, the polycarboxy component used to prepare the polyester (B) of the invention comprises less than 2 mole %, more preferably less than 1 mole %, typically less than 0.5 mole % of alpha, beta-unsaturated acids such as citraconic acid, fumaric acid, itaconic acid, maleic acid and/or mesaconic acids, their corresponding anhydrides, methyl and/or ethyl esters. Typically however no unsaturated acids like alpha, beta-unsaturated polyacids are used. Though tri- and higher functionalized polycarboxylic compounds could in principle be used, they are less suited in the framework of the present invention.

Preferred in the context of the invention are inert polyesters (B) prepared from (a) phthalic anhydride; from (b) isosorbide; from (c) ethylene glycol, diethylene glycol and/or hydrogenated bisphenol A; and, optionally, from (d) neopentyl glycol. These building units preferably constitute the polyol and polyacid components used. Monocarboxylic compounds (X1), monohydroxy compounds (X2) or monoepoxy compounds (X3) are optional further building units (see the polyesters B2 infra).

Preferred in the invention are polyesters (B) with a hydroxyl value of between 30 and 150 mg KOH/g.

The one or more inert polyesters (B) used in the invention can be OH-terminated polyesters and/or can be COOH-terminated polyesters.

OH-terminated polyesters (B) are preferred. By an "OH-terminated polyester" in the present invention is meant an inert polyester prepared from mixtures of at least one polyol and at least one polyacid as given above (any of the embodiments), wherein the total equivalent ratio of hydroxyl groups from the polyols to carboxyl groups from the polyacids exceeds 1.0. Preferred are mixtures wherein this ratio exceeds 1.02; more in particular exceeds 1.04. A molar excess of hydroxyl groups will result in polyesters that have free hydroxyl groups attached to the polymer backbone, in particular on the ends of the polymer backbone. By "free hydroxyl" is meant herein hydroxyl groups that have not reacted with carboxyl groups or other moieties to form new covalent bonds.

Preferred are those that have a hydroxyl number of between 50 and 150 mg KOH/g. Preferably the hydroxyl number is at least 60 mg KOH/g, more preferably at least 70 mg KOH/g. Preferably the hydroxyl number does not exceed 140 mg KOH/g, more preferably does not exceed 130 mg KOH/g.

Preferably the acid number of these OH-terminated polyesters is at most 70 mg KOH/g, more preferably at most 60 mg KOH/g, more preferably at most 50 mg KOH/g.

A second aspect of the invention concerns an inert OH-terminated polyester (B) of the invention (any of those described above and in sequel) as well as inert polyesters (B21) prepared therefrom (see infra).

By a "COOH-terminated polyester" (B) in the present invention is meant an inert polyester made from mixtures of at least one polyol and at least one polyacid as given above (any of the embodiments), wherein the total equivalent ratio of carboxyl groups from the polyacids to hydroxyl groups from the polyols exceeds 1.0. Preferred are mixtures wherein this ratio exceeds 1.02; more in particular exceeds 1.04. A molar excess of carboxyl groups will result in polyesters that have free carboxyl groups attached to the polymer backbone, in particular on the ends of the polymer backbone. By "free carboxyl" is meant herein carboxyl groups that have not reacted with hydroxyl groups or other moieties to form new covalent bonds.

Preferred are those that have an acid number of between 50 and 150 mg KOH/g. Preferably the acid number is at least 60, more preferably at least 70 mg KOH/g. Preferably the acid number does not exceed 140, more preferably does not exceed 130 mg KOH/g. Preferably the hydroxyl number of these COOH-terminated polyesters is at most 70 mg KOH/g, more preferably at most 60 mg KOH/g, more preferably at most 50 mg KOH/g.

The above polyesters (OH— or COOH-terminated), optionally, can be capped or functionalized with one or more of monocarboxylic compounds (X1) and/or monohydroxy compounds (X2). According to a first variant of the invention the inert polyester is not capped or functionalized. The inert polyesters of this first variant are further referred to as the inert polyesters (B1). According to a second variant of the invention the inert polyesters are further reacted with these one or more of monocarboxylic, monohydroxy and/or monoepoxy compounds (X1, X2, X3). Monocarboxylic compounds (X1) and monohydroxy compounds (X2) are herein preferred. The resulting polyesters are further referred to as the inert polyesters (B2). The inert polyester resins (B2) can be prepared in various ways. Either an inert OH— terminated polyester is first prepared, which is then further reacted with one or more monocarboxylic compounds (X1). Either an inert COOH— terminated polyester is first prepared, which is then further reacted with one or more monohydroxy compounds (X2). Or an inert COOH— terminated polyester is first prepared, which is then further reacted with one or more monoepoxy compounds (X3) like e.g. Cardura® E-10 (the glycidyl ester of neodecanoic acid). Alternatively, all ingredients are mixed to react in a one-pot system.

An embodiment of this second variant relates to inert COOH-terminated polyesters that are further reacted with one or more monohydroxy compounds (X2)—also referred to as inert polyesters (B22) of the invention.

Preferably the amount of monohydroxy compounds (X2) used to prepare inert polyesters (B22) is calculated to obtain a theoretical acid value of at most 120 mg KOH/g, in general at most 100 mg KOH/g, typically at most 80 mg KOH/g and most typically at most 50 mg KOH/g.

Examples of suitable monohydroxy compounds (X2) that can be used in this embodiment of the second variant are methanol; ethanol; isopropanol; n-propanol; sec-butanol; iso-butanol; n-butanol; tert-butanol; methyl-amyl alcohol; 2-methyl-1-butanol; cyclohexanol; or mixtures of any of these. Glycol ethers can also be used such as propylene glycol monomethyl ether, ethylene glycol monomethyl ether, propylene glycol t-butyl ether, ethylene glycol monopropyl ether, propyleneglycol monopropyl ether, propylene glycol isobutyl ether, propylene glycol monobutyl ether, ethylene glycol monobutyl ether, or mixtures of any of these.

Another and preferred embodiment of this second variant relates to inert OH-terminated polyesters that are further reacted with one or more monocarboxylic compounds (X1)—also referred to as inert polyesters (B21) of the invention.

Preferably the amount of monocarboxylic compounds (X1) used to prepare inert polyesters (B21) is calculated to obtain a theoretical hydroxyl value between 120 and 0 mg KOH/g. Preferably the residual hydroxyl value of the polyester (B21) is at most 100 mg KOH/g, more preferably at most 80 mg KOH/g. Particularly preferred are inert polyesters (B21) that have a residual hydroxyl number of between 5 and 80 mg KOH/g. Often the residual hydroxyl number is at most 60 mg KOH/g, more typically at most 50 mg KOH/g.

By "residual" is meant herein a value for hydroxyl groups that remain after reaction with the one or more monocarboxylic compounds (X1).

Preferably the acid number of the inert polyesters (B21) is at most 50 mg KOH/g, more preferably at most 25 mg KOH/g, more preferably at most 10 mg KOH/g.

Examples of suitable monocarboxylic compounds (X1) that can be used are monocarboxy-substituted moieties having photo-initiating activity. Preferred are photo-initiators of the carboxylic substituted benzophenone-type. Examples of such compounds are 2-(4-chlorobenzoyl)benzoic acid (Chloro-AOBB), o-benzoylbenzoic acid (o-BBA), o-(p-dimethylaminobenzoyl)benzoic acid, o-(p-diethylaminobenzoyl) benzoic acid etc. as described in e.g. U.S. Pat. No. 4,028,204. Also suitable is 2-(4-Phenylbenzoyl)benzoic acid. Another example of a monocarboxylic compound without photo-initiating properties that can be used is benzoic acid and substituted benzoic acid, or any combination thereof. Examples of substituted benzoic acid include tert-butyl benzoic acid (such as 4-tert-Butylbenzoic acid, 3-tert-Butylbenzoic acid, or 2-tert-Butylbenzoic acid), naphthalene carboxylic acid, 4-dimethylaminobenzoic acid and any combinations thereof. Particularly suited are 2-(4-chlorobenzoyl)benzoic acid, o-benzoylbenzoic acid, 2-(4-Phenylbenzoyl)benzoic acid, benzoic acid, substituted benzoic acid, or any mixture thereof.

According to a third variant of the invention, the composition of the invention comprises one or more inert polyesters (B1) according to the first variant and one or more inert polyesters (B2) according to the second variant. Polyesters (B1) preferably are OH-terminated. Polyesters (B2) preferably are prepared from such OH-terminated polyesters (B1).

Typically, based on the total weight of the inert polyesters (B), the weight percentage of inert polyesters (B1) of the first variant is between 0 and 100%, and the weight percentage of inert polyesters (B2) of the second variant is between 100 and 0%.

Preferably the inert polyesters (B) of the invention contain from 5 to 80% by weight (wt %) of cyclic ether polyols (in casu dianhydrohexitols), relative to the total weight of the compound (B). Typically this amount is at least 10 wt %, more preferably at least 15 wt %. Typically this amount is at most 50 wt %, preferably at most 35 wt %, more preferably at most 25 wt %, based on the total weight of compounds (B).

The present invention allows to make compounds (A) with high renewable content. For instance compounds (A) can be prepared wherein at least 5% by weight, at least 10% by weight, even at least 20% by weight of the raw materials used to prepare said compounds are from renewable origin.

Inert polyesters (B) of the invention (according to any of the embodiments or variants) typically have a number average molecular weight (Mn) of between 500 and 5000 Daltons. Preferably the Mn is at least 500 Daltons, more preferably at least 750 Daltons. Preferably the Mn is at most 2500 Daltons, more preferably at most 2000 Daltons, most preferably is at most 1500 Daltons, often at most 1350 Daltons.

Inert polyesters (B) of the invention (according to any of the embodiments or variants) typically have a weight average molecular weight (Mw) of between 1000 and 10000 Daltons. Preferably the Mw is at least 1200 Daltons, more preferably at least 1500 Daltons. Preferably the Mw is at most 3500 Daltons, more preferably at most 3000 Daltons.

Molecular weights (Mn or Mw) typically are determined via gel permeation chromatography (GPC), typically using polystyrene standards. Most typically the Mn and Mw are measured by GPC as described below.

Based on the total amount of compounds (A) and (B), the amount of inert polyesters (B) in general is between 20 and 80% by weight (wt %). More typically this percentage is at least 30 wt %, more preferably at least 40 wt %. Generally their amount does not exceed 60 wt %, more preferably it does not exceed 55 wt %.

Preferably the inert polyesters (B) of the invention are characterized by a glass transition temperature (Tg) of the cured material ranging from 35 to 100° C., as measured by DMA method ASTM D7028-07. Typically the Tg is at least 40° C., often at least 50° C. Typically the Tg is at most 160° C., more preferably at most 120° C.

The compositions according to the invention optionally may comprise other inert resins (C), which do not take part in the polymerisation reaction like the ones described in e.g. WO2002/38688, WO2005/085369, WO2008/015474, WO2008/004002, EP1411077, & U.S. Pat. No. 5,919,834. By "other" is meant different from the inert polyester (B). Examples of such optional inert resins (C) typically include hydrocarbons (such as styrene based hydrocarbon resins), styrene allyl alcohols, acrylics (such as acrylic (co)polymers), (poly)urethane resins, polyethylenevinylacetate resins, polyvinylchloride resins, chlorinated polyolefin resins and/or ketone resins. Particularly preferred examples of suitable inert resins (C) have been described in EP11161141.4. Possibly the inert polyester (C) can be an inert polyester that does not contain any isosorbide building blocks. For some examples, see for instance EP11161137.2. Particularly suited are e.g. EBECRYL® 525 and optionally chlorinated variants thereof (such as EBECRYL® 436 and others).

Where present, based on the total amount of (A), (B) and (C), the amount of inert resins (C) in general is between 10 and 40% by weight.

The total amount of such optional inert resins (C) or mixtures thereof, does usually not exceed 30 wt %, preferably this amount does not exceed 20 wt %, more preferably this amount does not exceed 10 wt %, based on the total weight of inert resins (B) and (C). More in particular the composition of the invention can be substantially free from inert resins (C). By substantially free is meant that their amount is at most 10 wt %, typically at most 5 wt %, relative to the total weight of the composition. In a particular embodiment of the invention, no inert resins (C) are present in the composition.

Based on the total amount of (A), (B) and (C), the total amount of inert resins (B) and (C) in general is between 20 and 80% by weight. More typically this percentage is at least 30%, more preferably at least 40%. Generally their amount does not exceed 75%, more preferably it does not exceed 55% by weight.

In general the (binder) composition of the invention comprises from 20 to 80% by weight of compounds (A) and from 80 to 20% by weight of inert resins (B) and, optionally (C). More in particular the (binder) composition of the invention comprises from 40 to 60% by weight of compounds (A) and from 60 to 40% by weight of inert resins (B) and, optionally (C).

The (meth)acrylated compounds (A) used in the present invention can be in the form of monomers, oligomers, polymers or mixtures thereof. Often they are acrylated compounds. Preferred are those that are liquid at room temperature. Some examples of suitable compounds are given below.

Examples of (meth)acrylated oligomers or polymers (A1) that can be used in the present invention include: polyester (meth)acrylates, urethane (meth)acrylates, alkoxylated (meth)acrylated oligomers, epoxy (meth)acrylates, aminated (meth)acrylates, (meth)acrylated (meth)acrylics, and (meth)acrylic (co)polymers (also referred to as full acrylics), inert polyesters that optionally are chlorinated, or mixtures thereof.

Examples of suitable polyester (meth)acrylates are acrylated epoxidized soybean oil compounds like EBECRYL® 860 (Cytec), fatty acid containing polyester (meth)acrylates like EBECRYL® 870, EBECRYL® 657, EBECRYL® 450 (Cytec), and polyester (meth)acrylates like EBECRYL® 800, EBECRYL® 884, EBECRYL® 810 and EBECRYL® 830 (Cytec). Examples of suitable epoxy (meth)acrylates are the di(meth)acrylate of diglycidyl ether of Bisphenol A (BADGED(M)A), and modifications thereof (see for instance EBECRYL® 3700 or EBECRYL® 600, EBECRYL® 3701, EBECRYL® 3703, EBECRYL® 3708 and EBECRYL® 3639 from Cytec). Examples of suitable urethane (meth)acrylates are EBECRYL® 284, EBECRYL® 264, EBECRYL® 210, EBECRYL® 230, EBECRYL® 1290 (Cytec). Examples of suitable aminated (meth)acrylates are EBECRYL® 80, EBECRYL® 81, EBECRYL® 83, EBECRYL® 7100, P115 and others. Examples of suitable (meth)acrylic (co)polymers that may be used are EBECRYL® 745 and/or EBECRYL® 1200. Examples of suitable inert polyesters include, but are not limited to EBECRYL® 525 and optionally chlorinated variants thereof (such as EBECRYL® 436 and others).

Compounds (A1) typically have a molecular weight (MVV), and more in particular a weight average molecular weight, of from 200 to 5.000 Daltons. Typically the MW of these compounds is at least 300 and more preferably at least 500 Daltons. Typically the MW of these compounds is at most 2.000 and more preferably at most 1.000 Daltons.

In particular embodiments however the composition of the invention is substantially free from such compounds. By substantially free is meant that the amount of compounds (A1) in the composition is at most 10 wt %, typically at most 5 wt %, relative to the total weight of the composition.

Most typically however compounds (A) are reactive diluents (A2) with a molecular weight below 500 Daltons, often below 200 Daltons. Typically these reactive diluents are monomers.

Monomers used can be mono- and/or poly-functional (meth)acrylates. Especially the acrylated forms are used.

Examples of suitable compounds (A2) include but are not limited to butyl(meth)acrylate, methyl(meth)acrylate, isobutyl(meth)acrylate, 2-ethylhexyl(meth)acrylate, cyclohexyl(meth)acrylate, n-hexyl(meth)acrylate, isobornyl(meth)acrylate, iso-octyl(meth)acrylate, n-lauryl(meth)acrylate, octyl/decyl(meth)acrylate, 2-hydroxyethyl(meth)acrylate, phenoxyethyl(meth)acrylate, nonylphenolethoxylate mono(meth)acrylate, 2-(-2-ethoxyethoxy)ethyl(meth)acrylate, 2-butoxyethyl(meth)acrylate, 1,6-hexanediol di(meth)acrylate (HDD(M)A), di or tri propylene glycol di(meth)acrylate (DPGD(M)A, TPGD(M)A), ethoxylated and/or propoxylated neopentylglycoldi(meth)acrylate, pentaerythritoltri(meth)acrylate (PETI(M)A) and the ethoxylated and/or propoxylated derivatives thereof, trimethylolpropanetri(meth)acrylate (TMPT(M)A) and the ethoxylated and/or propoxylated derivatives thereof, di-trimethylolpropanetri(meth)acrylate (diTMPT(M)A) glyceroltri(meth)acrylate and the ethoxylated and/or propoxylated derivatives thereof, bisphenol A di(meth)acrylate and the ethoxylated and/or propoxylated derivatives thereof, the di(meth)acrylate of a dianhydrohexiol (like isosorbide di(meth)acrylate) and the ethoxylated and/or propoxylated derivatives thereof, phenylglycidylether(meth)acrylate and the ethoxylated or/and propoxylated derivatives thereof, the (meth)acrylates obtained from the esterification with (meth)acrylic acid of aliphatic glycidyl ethers, especially those wherein the alkyl chain comprises from 6 to 24 carbon atoms, more preferably from 8 to 18 carbon atoms, and/or of glycidyl esters of saturated and unsaturated carboxylic acids, especially the glycidyl esters of long chain alkyl carboxylic acids wherein the alkyl chain comprises from 6 to 24 carbon atoms, more preferably from 8 to 18 carbon atoms.

Preferred monomers (A2) are di- and/or tri-(meth)acrylated monomers such as 1,6-hexanediol di(meth)acrylate (HDD(M)A), di or tri propylene glycol di(meth)acrylate (DPGD(M)A, TPGD(M)A), trimethylolpropanetri(meth)acrylate (TMPT(M)A) and the ethoxylated and/or propoxylated derivatives thereof, pentaerythritoltri(meth)acrylate (PETI(M)A) and the ethoxylated and/or propoxylated derivatives thereof, glyceroltri(meth)acrylate and the ethoxylated and/or propoxylated derivatives thereof, bisphenol A di(meth)acrylate and the ethoxylated and/or propoxylated derivatives thereof, the di(meth)acrylate of a dianhydrohexiol (like isosorbide di(meth)acrylate). Particularly preferred are dipropyleneglycol diacrylate (DPGDA), tripropyleneglycol diacrylate (TPGDA) and/or trimethylolpropane tri(meth)acrylate (TMPTA).

The inert resins (B) of the invention as well as any optional resins (C) used in the invention typically are soluble in the reactive diluents (A2). The inert resins ((B) and optionally (C)) typically are soluble in such diluting (meth)acrylate monomers in at least 20 wt %, more preferably at least 30 wt %.

Preferably, compositions of the invention comprise at least one monomer (A2) selected from di(meth)acrylates and/or tri(meth)acrylates.

Mono-functional and/or tetra-functional (meth)acrylates can be used, but preferably they are used in an amount lower than 40% by weight, more preferably less than 20% by weight, based on the total amount of mono- and poly-functional monomers (A2).

Preferably the (meth)acrylated compound (A2) is for at least 80 wt % comprised of di-functional (meth)acrylates and/or tri(meth)acrylates, and for at most 20 wt % of mono-functional (meth)acrylates and/or tetra-functional (meth)acrylates. Most preferably the (meth)acrylated compound (A2) contains no mono-functional (meth)acrylates.

The above diluting monomers (A2) can, optionally, be further reacted with an amine to form an amino (meth)acrylate (A3) having residual free (meth)acrylate groups. By "residual free" is meant (meth)acrylate groups that remain after reaction with the amines. Preferred are amino (meth)acrylates with two or three (meth)acrylate groups per molecule after reaction with the amines. The (meth)acrylate group preferably is an acrylate group.

Amino (meth)acrylates (A3) can be added as such to the composition of the invention but may also be formed in situ by introducing the amine to the blend of inert polyesters ((B) and optionally (C)) and (meth)acrylated compounds (A2). The amines used in this reaction are generally selected from primary amines and secondary amines. Generally preferred are primary amines comprising at least one primary amino group (—NH$_2$) and/or secondary amines comprising at least two secondary amino groups (—NH) as described in WO 2008/000696—see compounds A1 & A2 therein. Process conditions as described therein can also be used here.

Examples of suitable amino (meth)acrylates (A3) include EBECRYL 7100, EBECRYL 80, EBECRYL 81, EBECRYL 83, EBECRYL 84, EBECRYL LEO 10551, EBECRYL LEO 10552 & EBECRYL LEO 10553, all available from Cytec.

Amino (meth)acrylates (A3) and amine derivatives (D) in general can act as photoactivators and enhance cure speed in the presence of type II photoinitiators, and benzophenone derivatives in particular.

Based on the total amount of compounds (A), (B) and optionally (C), the total amount of (meth)acrylated compounds (A) in general is between 15 and 85% by weight. More typically this percentage is at least 25%, more preferably at least 35%. Generally their amount does not exceed 75%, more preferably it does not exceed 65% by weight.

Typically, on the total amount of compounds (A) the amount of diluting monomers (A2 plus A3) is between 20 and 100% by weight. More typically this percentage is at least 50%, more preferably at least 80%, generally it is 100%.

The optional amine derivatives (D) can replace up to 50% by weight, typically up to 25% by weight of the total amount of (meth)acrylated compounds (A). When present, the amine derivatives (D) typically are used in an amount from 0.01 to 25% by weight, in general from 5 to 20% by weight, based on the total weight of the composition.

Viscosity of the binder, more in particular the blend composed of compounds (A), (B) and (C), typically ranges from 100 to 100000 mPa·s at 25° C. Preferably the viscosity ranges from 200 to 50000 mPa·s. More preferably the viscosity ranges from 500 to 30000 mPa·s as measured using a cone and plate type rheometer with an adapted spindle and shear rate.

The compositions according to the invention can be prepared by any method suitable therefore. They are usually prepared by dissolving the inert resins (B) and where present (C) in at least part of the (meth)acrylated compounds (A) added, preferably at a temperature of at least 20° C., more preferably of at least 30° C., most preferably of at least 60° C. The temperature preferably does not exceed 150° C., more preferably it does not exceed 110° C. The compositions according to the invention can be prepared in the presence of an organic solvent, which is thereafter eliminated from the composition, for example by stripping. Other ingredients can be added to the composition. More preferably, no solvents are used.

Other compounds can be added like pigments, dispersing agents or other additives, charges and photoinitiator. Often a photoinitiator and, optionally, a photoactivator are added. Generally, the composition of the present invention comprises at least 10 wt %, more preferably at least 15 wt % and most preferably at least 20 wt % of (meth)acrylated compounds (A), based on the total weight of the composition. The amount of such compounds (A) in the composition usually does not exceed 85 wt %, preferably does not exceed 75 wt % and more preferably does not exceed 65 wt %.

Generally, the composition of the present invention comprises at least 20 wt %, more preferably at least 30 wt % by weight and most preferably at least 40% by weight of the inert resins (B) and (C), based on the total weight of the composition. The amount of inert resins (B) and (C) in the composition usually does not exceed 75% by weight, preferably does not exceed 65% by weight, and more preferably does not exceed 55% by weight.

Typically the compositions of the invention comprise, based on the total weight of (A), (B) and (C), between 15 and 85 wt % of the compounds (A) and between 85 and 15 wt % of inert polyesters (B) and (C).

Generally, the composition of the present invention comprises at least 30 wt %, more preferably at least 40 wt % and most preferably at least 50 wt % of the inert resins (B), based on the total weight of the composition.

Compositions of the invention typically are cured by ultraviolet irradiation, generally in the presence of photoinitiator, which may be a polymeric photoinitiator. They can also be cured by electron-beam irradiation, allowing the use of compositions free of photoinitiator. The compositions according to the invention are providing extremely rapid curing.

Photoinitiators where present typically are added in an amount of from 0.1 to 10 parts by mass per 100 parts by mass of photopolymerizable compounds. Examples of suitable photoinitiators include but are not limited to an aryl ketone type photoinitiator (such as an acetophenone, a benzophenone, an alkylaminobenzophenone, a benzyl, a benzoin, a benzoin ether, a benzoin dimethyl ketal, a benzoyl benzoate or an [alpha]-acyloxime ester), a sulfur-containing photopolymerization initiator (such as a sulfide or a thioxanthone), an acylphosphine oxide (such as an acyldiarylphosphine oxide) or other photopolymerization initiators. The photopolymerization initiator may be used as a mixture of at least two types thereof in combination. Further, the photopolymerization initiator may be used in combination with a photosensitizer such as an amine.

Alternatively, or in addition compositions of the invention may comprise at least one radical polymerization initiator such as benzoyl peroxide, methyl cyclohexanone peroxide, cumene hydroperoxide, diisopropyl benzene peroxide, di-t-butyl peroxide, t-butyl peroxide and the like. Compositions of the invention may further comprise, if the case requires, at least one of the following: an ultraviolet absorber, a photostabilizer, an antioxidant, a thermal polymerization inhibitor, a leveling agent, a defoaming agent, a thickener, a sedimentation-preventing agent, a pigment (organic coloring pigment, inorganic pigment), a coloring dye, an infrared absorber, a fluorescent brighter, a dispersant, an antistatic agent, an anti-fogging agent, and/or a coupling agent.

In a particular embodiment of the invention, the composition is a coating composition. Coating compositions can be clear (e.g. lacquers or varnishes) or pigmented. Compounds (B) of the invention are particularly suited for the preparation of hard coats. By a hard coat composition in the context of the invention is meant to designate a composition that after cure has a Persoz hardness of at least 300 sec as measured at 25° C. on 40 micron films on glass.

Coating compositions of the invention may be used in a wide variety of applications and on a wide variety of substrates and articles including molded articles.

Substrates that may be treated or coated with compositions of the invention include metal, wood, paper, concrete, plastics (porous and non-porous), glass, as well as coating surfaces. Articles or materials to which the coating composition is applied may for instance already contain one or more coating layers (e.g. articles or material may already contain a primer or a base coat).

Coating compositions of the invention can in particular be applied to paper, wood, metal, concrete and plastic.

Compositions of the invention in particular exhibited excellent adhesion on plastics, including polyvinylchloride, polycarbonate, polyethylene, acrylonitrile butadiene styrene copolymers etc. A preferred composition of the invention is a hard coat composition.

In another particular embodiment of the invention the composition is an ink or overprint varnish. It can also be an adhesive. The ink may be an ink used in lithographic, flexographic or inkjet applications. Inks of the invention may be used in the packaging industry, and are suitable for use on food packaging and more in particular for indirect food contact.

Curing time and conditions may vary according to the constituents of the composition, the thickness of the coating film and the active energy ray source used. Usually curing is achieved by irradiation for about 0.1 to about 60 seconds. Further, for the purpose of completing the curing reaction, a heat treatment may be carried out after irradiation with active energy rays. Compositions of the invention can be applied via any suitable technique used in the art that includes but are not limited to brushcoating, dipcoating, rollercoating, curtaincoating, spraycoating, vacuumcoating, flexo printing, gravure printing, lithographic printing, inkjet printing etc.

Compositions of the invention typically have a viscosity at 25° C. in the range of from 400 to 40.000 mPa·s. More preferably the viscosity at this temperature is in the range of from 400 to 20.000 mPa·s, most preferably from 400 to 10.000 mPa·s.

Though solvents may be used, compositions of the invention typically comprise at most 0.1% by weight of solvents. Usually this amount is at most 0.01% by weight, more preferably at most 0.001% by weight.

Compounds (B) of the invention are highly suitable for use in coating compositions. Compounds (B) of the invention are further also highly suitable for use in inks or adhesives.

An aspect of the invention relates to coating compositions, adhesives, inks or varnishes comprising a composition, more in particular a binder composition according to the invention or an inert polyester (B) according to the invention.

Yet another aspect of the invention relates to coating compositions, adhesives, inks or varnishes prepared from a composition, more in particular a binder composition according to the invention, or from an inert polyester (B) of the invention.

Compounds (B) of the invention and compositions of the invention are further also suited for the making of polymer matrixes in composite materials (clear or pigmented).

Yet a further aspect of the invention concerns a composite matrix (clear or pigmented) prepared from a composition, more in particular a binder composition according to the invention, or from an inert polyester (B) of the invention.

An advantage of compositions of the invention is that they can be substantially free from halogenated, more in particular chlorinated compounds. By substantially free is meant to designate in particular that the Chlorine content is less than 1 wt %.

Yet another advantage of compositions of the invention is that they allow to obtain a high cure speed comparable to a chlorinated polyester (with e.g. a Chlorine content >20 wt %) in reactive diluent.

Compositions according to the invention after curing further permit to obtain excellent adhesion on various organic and inorganic substrates such as plastic, metal, glass, wood, paper, in combination with high cure speed and low viscosity. In particular adhesion on plastic substrates like polypropylene, bioriented polypropylene, polyethyelene, polyvinylchloride, polyester and polyamide films. Plastics can be of any type, e.g. the woven or non-woven type, can be porous or permeable etc. The plastic can be rigid but preferably is flexible.

An advantage of the compositions of the invention is that they permit to obtain good adhesion on e.g. plastics without the need of an (or another) adhesion primer. The possibility to graft functional groups on the polyester resin (B) can further improve adhesion and reactivity. Pigment wetting is excellent which makes the compositions of the invention useful as ink vehicle for the preparation of inks, in particular inks for gravure, for lithographic, screen and flexographic applications.

The compositions of the invention are particularly suited for printing onto a wide variety of rigid and flexible graphics, packaging and label substrates, as well as most plastics, glass and metal foil. The compositions of the invention are very suited for gravure, flexographic and lithographic applications. They are most suited as flexo inks for narrow, mid and wide web applications. They are further also highly suited as litho inks.

The composition of the present invention is therefore useful as ink vehicle for the preparation of inks. Typical ingredients used in the preparation of inks (paste or liquid) may thus be added.

These compounds are generally selected from organic and inorganic pigments, photoinitiators, fillers and additives.

The pigments usable in the compositions of the invention are every pigments used in paste inks or liquid inks. A list of such pigments can be found in the Color Index. The pigments are preferably used at 0 to 60% by weight of the total weight of the composition, more preferably at 1 to 50% by weight.

The photoinitiators usable in the compositions of the invention are well known in the art. They can be chosen from α-hydroxyketones, α-aminoketones, benzildimethyl-ketals, acyl phosphines, benzophenone derivatives, thioxanthones and blends of these. They are used at 0 to 15% by weight. Generally, photoactivators are chosen between amine derivatives (D) and amino(meth)acrylates (A3) as discussed above such as EBECRYL P115, EBECRYL P116, EBECRYL 7100, EBECRYL 80, EBECRYL 81, EBECRYL 83, EBECRYL 84, EBECRYL LEO 10551, EBECRYL LEO 10552 & EBECRYL LEO 10553, all available from Cytec. In general photoinitiators and possibly also photoactivators are added if the compositions are cured with ultraviolet light. The compositions may however also be cured by electron beams rays, and, in this case, no photoinitiator and photoactivator needs to be added to the composition. In addition, advantageously no photoiniator needs to be added to the composition when a moiety with photoinitiating activity, more in particular a benzophenone derivative, is grafted onto the inert polyester of the invention (see inert polyesters B2 above). In such case, it may be advantageous to add photoactivators to the composition.

The additives are those commonly used in inks, such as stabilizers, substrate wetting agents, anti-foam agents, dispersing agents, etc. The total amount of those additives does usually not exceed 10%.

As fillers products such as calciumcarbonate, talc (magnesium silicate), kaolin clay (aluminium silicate), bariumsulphate, aluminium hydroxide, siliciumdioxide can be used. The amount of fillers is generally from 0 to 15% by weight of the total weight of the composition.

The composition according to the invention comprises, based on the total weight of the composition, from 20 to 70% by weight of the binder (composed of compounds (A), (B) and (C)), from 0 to 50% by weight of pigments, and from 0 to 50% by weight of one or more usual ingredients selected from additives, fillers, photoinitiators and the like. Typically the compositions of the invention comprise, based on the total weight of the composition, at least 20% by weight of the binder, often at least 40% by weight of binder.

An aspect of the invention relates to coating compositions and in particular inks and varnishes that comprise the binder composition as described above. Provided are inks and varnishes that are prepared from the binder compositions of the invention. The invention also relates to a process for the preparation of inks, in particular flexographic, litho inks and screen inks, wherein a binder composition according to the invention is used. More preferably, this invention relates to a process for the preparation of flexographic inks.

Flexographic inks are generally made in 2 steps, the pigment dispersion step and the letdown step. The composition according to the invention can be used in one or both of these steps. The composition according to the invention is preferably used as binder at least in the first step. In the first step, the pigments and optionally a photoinitiator, fillers and/or additives are added to at least part of the composition comprising the resin (B), the resin (C) and (meth)acrylated compound (A). They are mixed and then dispersed on a triple roll or bead mill. A few passes might be necessary to achieve a good dispersion. Pigments that are difficult to disperse generally require more number of passes. The compositions according to the invention showing good pigment wetting, permit to limit the number of additional passes. Once the pigment has achieved this fineness, the pigment paste is further diluted with the letdown. This letdown is preferably composed of the same resin components (A), (B) and (C). The letdown has to be compatible with the binder used to disperse the pigments.

The finished ink preferably has a viscosity higher than 300 mPa·s measured at a shear rate of 2500 s−1 at 25° C. (measured using a cone and plate type rheometer with a cone diameter of 25 mm and at an angle of 1° for the cone). The measurement is generally done by measuring a flow curve in controlled shear rate ranging from D=0.1 s−1 to D=2500 s−1 at 25° C. The finished ink preferably has a viscosity measured as here above of at least 500 mPa·s. The viscosity of the final generally does not exceed 8000 mPa·s, preferably it does not exceed 4000 mPa·s (at 25° C. and 2500 s−1).

The finished ink is then printed onto the substrate. The ink film can then be cured under a UV lamp, for example at 120 W/cm and 50 m/min. A few passes may be required to cure the ink if the binder is not reactive enough.

An aspect of the invention concerns the use of a composition of the invention or of an inert polyester (B) of the invention for the making of an ink, an adhesive or a coating (including an overprint varnish).

Yet a further aspect of the invention concerns a composite matrix (clear or pigmented) comprising at least one compound (B) according to the invention and/or at least one composition according to the invention, and at least one reinforcement material. The reinforcement material used can be fibrous or non-fibrous. Examples of non-fibrous materials include but are not limited to alumina trihydrate, barium sulfate, calcium carbonate, clay, glass microspheres, kaolin, metal fillers, carbon black, mica, organic fillers (wood flour, corncobs, rice/peanut hulls, and nutshells), silicas, talc, wollastonite and other nano-sized materials. Examples of fibrous materials include but are not limited to boron fibers, carbon fibers, aramid fibers, ceramic fibers, glass fibers, natural (such as but not limited to hemp, jute, flax, kenaf, leaf fibers) or synthetic fibers as described in U.S. Pat. No. 8,012,573, EP2226171, U.S. Pat. No. 7,250,209. Often a glass filler is used as reinforcement material. Examples of suitable glass fillers include but are not limited to glass fibers, glass cloths, nonwoven glass fabrics and other glass fiber cloths, glass beads, glass flakes, glass powders, milled glass species and so forth. Among them, glass fibers, glass cloths and nonwoven glass fabrics are preferred in view of their being highly effective in reducing the coefficient of linear expansion. Glass cloths are most preferred.

The invention also relates to the polymeric compositions obtainable by curing the radiation curable composition, as well as to substrates or articles being partially or entirely coated with the polymeric composition.

The invention also relates to a process for coating an article or a substrate comprising the step of applying onto at least one surface of said article or of said substrate the composition of the invention, following by curing of the applied layer. The composition of the invention can be directly applied onto said substrate or said article without the need of an adhesion primer. A physical treatment (e.g. corona) and/or chemical treatment before applying the radiation curable composition is preferred in some cases. The composition of the invention can be applied in one or more layers of between 0.5 and 10 μm by means of flexographic process, lithographic process, gravure, screen printing, letterpress, roller coater, curtain coater. Preferably, it is applied by flexographic process. The material or surface to be coated can comprise plastic, in particular can be made of plastic, including a non polar plastic. The plastic can be flexible or rigid.

Further provided is also a method of improving adhesion of a radiation curable ink to a substrate in a printing process, said method comprising the step of applying a composition of the invention (more in particular an ink of the invention) to a surface of the substrate followed by a step of curing by radiation, typically ultraviolet radiation. The composition of the invention can be applied in one or more layers of between 0.5 and 10 μm by means of flexographic process, lithographic process, gravure, screen printing, letterpress, roller coater, curtain coater. Preferably, it is applied by a flexographic process. The material or surface to be coated can comprise plastic, in particular can be made of plastic, including a non polar plastic. The plastic can be flexible or rigid. An advantage of this process is that the composition of the invention can be applied directly onto the substrate. In other words, no primer layer needs to be applied first. Typically the substrate is a packaging or a label substrate for indirect food contact.

Yet another aspect of the invention concerns the use of an inert polyester (B) or a composition of the invention as adhesion promoter for inks on a plastic, for instance a plastic packaging. The packaging can be a food packaging such as a food packaging for indirect food contact.

The invention also relates to a flexible graphic, more in particular a packaging or label substrate, that is printed with a composition (more in particular an ink) according to the invention. The packaging can be a food packaging such as a food packaging for indirect food contact.

Still a further aspect of the invention concerns the use of an inert polyester (B) or a composition of the invention as primer on a difficult substrate, e.g. plastic or metal. The substrate can be plastic or a plastic containing material, in particular it can be a packaging. The packaging can be a food packaging such as a food packaging for indirect food contact.

The invention will now be described in more details in the examples below, which in no way are intended to be limited.

Throughout the invention and in particular in the examples the following measuring methods have been applied.

Molecular weight determination via GPC: A small portion of sample is dissolved in tetrahydrofuran (THF) and injected into a liquid chromatograph (Merck-Hitachi L7100) equipped 3×PLgel 5 μm Mixed-D LS 300×7.5 mm column. Typically polystyrene standards (typically in the Molecular Weight range 200-400.000 g/mol) are added as internal standards. The components of the sample are separated by the GPC columns based on their molecular size in solution and detected by a Refractive Index detector. Data typically are gathered and processed by Polymer Laboratories Cirrus GPC software.

Cure speed: max belt speed under a given lamp, giving a full cured film, measured by solvent rubs (ADR: acetone double rubs). A minimum of 50 ADR is required for a fully cured coating with optimum performance.

Minimum cure dose: is the minimal UV energy required to cure a 10 μm coating that withstand a minimal of 50 acetone double rubs (ADR). The UV lamp chosen is a medium pressure mercury lamp of 80 W/cm output. The lower the dose to cure the coating, the better is the reactivity of the resin. The min cure dose corresponds to the cure speed for a given lamp and reflector.

Acetone double rubs: The fully cured character of the film is assessed by putting some talc on the surface and rubbing with a finger and then with a cotton. A mat aspect indicates a not fully cured film. The coating typically is also submitted to 50 double rubs with a wad of cotton drenched in acetone. A fully cured film, is not visually affected by this test.

Persoz Hardness: pendulum hardness is measured for a 40 μm film on glass, cured 2× with the mininal cure dose, and is measured as the time (sec) required for the amplitude of the pendulum to drop from 12° to 4°. Harder coatings result in a longer oscillation time (less damping effect).

Tg measurement cured sample (5× min Cure dose): Tg is measured according DMA ASTM D7028-07. The conditions are as follows: DMA Q800 (TA instruments) tensile mode, frequency: 1 Hz, strain 10-30 tensile mode, frequency: 1 Hz, strain 10-30 μm, heatinprofile: −50 to 250° C. at 3°/min, sample dimension: 12×7.5×0.08 mm Viscosity: Cone & plate viscosity at a given temperature, usually 25° C., and a given rotation speed of the spindle, also referred to as shear rate.

Shortness index (SI): Ratio of viscosity at 2.5/2500 1/s shear rate.

Gloss: Gloss is measured by means of a TRI-MICRO-GLOSS 20-60-85 SHEEN apparatus. Measurements are made with 60° geometry.

Adhesion: Adhesion: a film of 1.2 μm is applied on the tested substrate and exposed to UV radiations from a 120 W/cm non focalized medium pressure mercury lamp at a speed of 60 m/min and fully cured as described in the reactivity method. A string of adhesive tape (Tesa 4104) is pressed on the surface and the interlayer is degassed. The tape is then snatched off. Based on the % of the surface removed by the tape, a value of adhesion is given: 0 (100% of the squares removed), 1 (65-35% of the squares removed), 2 (35-15% of the squares removed), 3 (15-5% of the square removed), 4 (less than 5% of the squares removed, 5 (0%).

Renewable Raw Material Content: The Renewable Raw Material Content is calculated as the weight ratio of the renewable raw materials versus the total weight of raw materials.

Acid number: The acid number (or acid value) is measured according to American Standard method (ASTM) D 974-64 and is expressed in mg KOH/g of product.

Hydroxyl value: The Hydroxyl value (or OHN value) is measured according to ASTM E 222-73 and is expressed in mg KOH/g of product.

Tack: Tack is the force required to split an ink film between two rollers by using a Tack-o-scope connected to a thermostatic water bath. The following conditions and equipment were used: Tack-o-scope with water bath at 30° C. for at least 30 min. Apply 0.3 cc of ink evenly across the front (distribution) roller of the Tack-o-scope. Place the front roller and the top (measuring) roller in contact with the central (drive)roller and distribute ink for 20 sec at speed 50 m/min. Record final tack value. Increase the speed to 100 m/min and keep for 20 s. Increase the speed to 150 m/min and keep for 20 s. Increase the speed to 200 m/min and keep for 20 s. Increase the speed to 250 m/min and keep for 20 s. Increase the speed to 300 m/min and keep for 20 s. Increase the speed to 350 m/min and keep for 20 s. Record the final tack value.

Color Density The color density of the printed ink at constant film thickness is measured. In this case the ink is printed using a lab applicator and the color density is measured with a densitometer, which spectrophotometrically compares the reflected light to the incident light. Here, a Gretag Macbeth Spectroeye Spectrophotometer/Densitometer equipped with the appropriate filters was used to measure optical density. Film thickness (in g/m2) is determined by comparing the weight of the printed form or substrate before and after printing.

Dry misting: Assessment of the misting of inks at higher temperature and at high speed was done by means of a Tack-O-scope connected to a thermostatic waterbath. The following conditions were used: Tack-o-scope with water bath at 50° C. for at least 30 min. Condition rollers for at least 5 min. Apply 0.5 cc/1 cc of ink evenly across the distribution roller of the Tack-o-scope. Put one paper under the rollers and tape together the 2 other papers longitudinally to enclose the tack-o-scope roller system. Place the front roller and the top roller in contact with the main roller and distribute ink for 30 sec at speed 50 m/min. Increase the speed slowly to 350 m/min. Once the paper has been exposed for exactly 1 min at 350 m/min stop the tack-o-scope and remove the paper. Quantify by measuring density at 3 points.

EXAMPLES

Synthesis Example EX1

Inert Polyester B-1

160 gr Isosorbide (Posysorb P from Roquette), 101 g of neopentyl glycol, 160 g of ethylene glycol, 657 g of phthalic anhydride are charged to a double-wall glass reactor equipped with a stirrer, a thermocouple attached to a thermoregulator, a gas inlet tube, a connection to vacuum and an distillation column. The mixture is then heated to a temperature of about 220° C. The polycondensation is continued until no more water is distilled over. Reduced pressure is applied gradually reaching a vacuum of −900 mmHg while the acid value is decreased. Upon reaching an acid value of 50 mg KOH/g the mixture t is cooled down to 100° C. for further dilution (see Table 2). The inert polyester thus obtained has a hydroxyl value of 75 mg KOH/g. The Mn of the polyester thus obtained is 1000 Daltons.

Synthesis Example EX2

Inert Polyester B-2

257 gr Isosorbide (Posysorb P from Roquette), 257 g of hydrogenated bisphenol A, 98 g of diethylene glycol, 443 g of phthalic anhydride are charged to a double-wall glass reactor equipped with a stirrer, a thermocouple attached to a thermoregulator, a gas inlet tube, a connection to vacuum and an distillation column. The mixture is then heated to a temperature of about 220° C. The polycondensation is continued until no more water is distilled over. Reduced pressure is applied gradually reaching a vacuum of −900 mmHg while the acid value is decreased. Upon reaching an acid value of 40 mg KOH/g the mixture t is cooled down to 100° C. for further dilution (see Table 2). The inert polyester thus obtained has a hydroxyl value of 125 mg KOH/g. The Mn of the polyester thus obtained is 710 Daltons.

Synthesis Example EX3

Inert Polyester B-3

470 gr Isosorbide (Posysorb P from Roquette), 239 g of ethylene glycol, 835 g of phthalic anhydride, 318 g of 2-(4-chlorobenzoyl)benzoic acid (Chloro-AOBB), are charged to a double-wall glass reactor equipped with a stirrer, a thermocouple attached to a thermoregulator, a gas inlet tube, a connection to vacuum and an distillation column. The mixture is then heated to a temperature of about 220° C. The polycondensation is continued until no more water is distilled over.

Reduced pressure is applied gradually reaching a vacuum of −900 mmHg while the acid value is decreased. Upon reaching an acid value of 10 mg KOH/g the mixture t is cooled down to 100° C. for further dilution (see Table 2). The inert polyester thus obtained has a hydroxyl value of 47 mg KOH/g. The Mn of the polyester thus obtained is 1090 Daltons.

Synthesis Example EX4

Inert Polyester B-4

190 gr Isosorbide (Posysorb P from Roquette), 190 g of hydrogenated bisphenol A, 95 g of diethylene glycol, 563 g of phthalic anhydride are charged to a double-wall glass reactor equipped with a stirrer, a thermocouple attached to a thermoregulator, a gas inlet tube, a connection to vacuum and an distillation column. The mixture is then heated to a temperature of about 220° C. The polycondensation is continued until no more water is distilled over. Reduced pressure is applied gradually reaching a vacuum of −900 mmHg while the acid value is decreased. Upon reaching an hydroxyl value of 30 mg KOH/g the mixture t is cooled down to 100° C. for further dilution (see Table 2). The inert polyester thus obtained has an acid value of 120 mg KOH/g. The Mn of the polyester thus obtained is 710 Daltons. This polyester typically is used diluted in TMPTA (40 wt %).

Properties of inert polyesters (B) of the invention as well as of inert polyesters used in comparison therewith are summarized in Table 2 below. Also resin properties are contained herein.

EG: ethylene glycol, DEG: diethyelene glycol, NPG: neopentyl glycol, PA: phthalic acid, ClAOBB: 2-(4-chlorobenzoyl)benzoic acid (Chloro-AOBB), BPA: bisphenol A, MW: molecular weight, Mn: number averaged molecular weight, Mw: weight average molecular weight, AN: acid number, OHN: hydroxyl value, TPGDA: tripropylene glycol diacrylate, TMPTA: trimethylolpropane triacrylate.

Properties of materials of the invention were compared with those of standard inert polyester resins like EBECRYL® 525 and EBECRYL® 436 (Cytec). These inert resins do not contain any isosorbide building blocks.

TABLE 2

| Constituents | EX1-R EBECRYL ™ 525 | | | EX1 | | | EX2-R EBECRYL ™ 436 Chlorinated | | | EX2 | | | EX3-R Example 5 of EP11161137.2 | | | EX3 | | |
|---|---|---|---|---|---|---|---|---|---|---|---|---|---|---|---|---|---|---|
| Inert polyester | | | | | | | | | | | | | | | | | | |
| | gr | PE wt % | PE mole % | gr | PE wt % | PE mole % | gr | PE wt % | PE mole % | gr | PE wt % | PE mole % | gr | PE wt % | PE mole % | gr | PE wt % | PE mole % |
| EG | | | | 160 | 15 | 31 | | | | | | | 20 | 4 | 7 | 239 | 13 | 23 |
| DEG | | | | | | | | | | 98 | 10 | 14 | | | | | | |
| NPG | | | | 101 | 9 | 11 | | | | | | | 180 | 32 | 40 | | | |
| PA | | | | 657 | 61 | 48 | | | | 443 | 42 | 44 | 280 | 50 | 43 | 835 | 45 | 48 |
| ClAOBB | | | | | | | | | | | | | 80 | 14 | 10 | 318 | 17 | 10 |
| Hydrogenated BPA | | | | | | | | | | 257 | 24 | 16 | | | | | | |
| isosorbide | | | | 160 | 15 | 10 | | | | 257 | 24 | 26 | | | | 470 | 25 | 19 |

| Properties | EX1-R | EX1 | EX2-R | EX2 | EX3-R | EX3 |
|---|---|---|---|---|---|---|
| AN | <49* | 50 | <42 | 40 | <7 | 9 |
| OHN | | 75 | | 125 | <32 | 47 |
| Mn GPC | 1190 | 1000 | 670 | 710 | 990 | 1090 |
| MW GPC | 2260 | 1670 | 950 | 1250 | 1560 | 1770 |
| Tg uncured (DSC) (° C.) | | 30 | | 20 | | 33 |
| Tg cured diluted resin (° C.) | 43 | 46 | 70 | 50 | 58 | 58 |
| Viscosity mPas 25° C. | 40000 | 32150 | 93000 | 167000 | 2500 | 5030 |
| Viscosity mPas 60° C. | | | 1500 | 2480 | | |
| Renewable Raw Materials (wt %) | 0 | 12 | 0 | 21 | 0 | 17 |
| Resin composition | | | | | | |
| TPGDA (wt %) | 40 | 40 | | | 50 | 50 |
| TMPTA (wt %) | | | 40 | 40 | | |
| Tg cured diluted resin (° C.) | 43 | 46 | 70 | 50 | 58 | 58 |

The inert polyesters have been dissolved at 70 to 90° C. in an acrylated diluent. EX1 and EX1-R were diluted in 40 wt % TPGDA. EX2 and EX2R were diluted in 40 wt % TMPTA. EX3 and EX3-R were diluted in 50 wt % TPGDA.

Formulation Examples

Flexo Inks

Flexo inks were prepared as show below, using the resins of EX3 and EX3-R. The inks were cured with a fusion lamp 120 W/cm by a number of passes at 30 m/min. The substrates were Corona pretreated and adhesion was measured with tap "tesa 4104".

Ink compositions and ahesion results are summarized in Tables 3 (cyan) and 4 (white) below.

TABLE 3

| Amount (in parts) | EX3 | EX3R |
|---|---|---|
| Pigment paste cyan | | |
| Resin | 54.5 | 54.5 |
| TPGDA | 6 | 6 |
| Additol S120 | 3.7 | 3.7 |
| Solsperse 39000 | 0.8 | 0.8 |
| Solsperse 5000 | 40 | 40 |
| Cyan pigment GLO | | |
| Cyan ink | | |
| Resin | 44 | 44 |
| TPGDA | 6 | 6 |
| PI blend | 10 | 10 |
| Pigment past cyan | 40 | 40 |
| Adhesion | | |
| C58 | 5 | 5 |
| GND | 5 | 5 |
| NND | 4 | 4 |
| RNK | 4 | 0 |

Additol S120: radical stabilizer,
Solsperse 39000: pigment dispersing agent,
Solsperse 5000: pigment dispersing agent,
GLO: cyan pigment,
PI: photinitiator,
RDIS: Ti02 pigment,
Additol TPO: Photoinitiator,
BOPP: Bioriented polypropylene;
PET: polyethylene terephtalate,
PE: polyethylene,
PVC: polyvinyl chloride,
PLA: polylactide,
PC: polycarbonate.

TABLE 4

| Amount (in parts) | EX3 | EX3R |
|---|---|---|
| White ink | | |
| Resin | 47 | 47 |
| TPGDA | 11 | 11 |
| Additol TPO | 5 | 5 |
| Additol S120 | 1 | 1 |
| Solsperse 39000 | 1 | 1 |
| RDIS | 40 | 40 |
| Adhesion | | |
| C58 | 0 | tacky |
| GND | 4 | tacky |
| NND | 2 | tacky |

TABLE 4-continued

| Amount (in parts) | EX3 | EX3R |
|---|---|---|
| BOPP* | 5 | tacky |
| RNK | 0 | tacky |

C58: Rayoface C58 - Transparent BOPP film, one side corona treated,
GND: Treofen GND 30 - Transparent BOPP film, one side corona treated,
NND: Treofen NND 30: Transparent high gloss BOPP film, one side corona treated,
BOPP*: BOPP film without adhesion primer;
RNK: Hostaphan RNK 12: PET film without adhesion primer.

The inks prepared from EX3, compared to those prepared from EX3-R, are providing better adhesion, and in case of the white flexo ink also the cure speed was higher. Full curing was obtained for a white ink according to the invention whereas under the same conditions the ink prepared from a polyester not containing any isosorbide building blocks was still tacky.

Litho Inks

A cyan litho ink was prepared as shown below using respectively the resins of EX2 and EX2-R. Results are summarized in Table 5 below. The inks were cured under a fusion lamp (120 W/cm).

TABLE 5

| Amount (in parts) | EX2-R | EX2 |
|---|---|---|
| Resin | 43 | 40 |
| TMPTA | 6 | 9 |
| Stab 12/1 | 1 | 1 |
| Talc C 1250 | 6 | 6 |
| Cyan pigment GLO | 17 | 17 |
| Standard PI blend | 8 | 8 |
| Resin | 14 | 14 |
| TMPTA | 6 | 7 |
| Resin | 0 | 0 |
| Total | 101 | 102 |
| RHEOLOGY | | |
| Vicosity 2.5 1/s | 71 | 87 |
| Vicosity 100 1/s | 29 | 32 |
| SI 2.5-100 | 2.5 | 2.5 |
| OTHER APLICATION RESULTS | | |
| Tack 50 m/min | 170 | 160 |
| Tack 350 m/min | 660 | 675 |
| Dry misting Tos 0.5 g | 0.28 | 0.29 |
| Density - 1.5 g/m2 | 2.12 | 2.08 |
| Gloss - 1.5 g/m2 60° | 21 | 20 |
| Cure speed 120 W/cm (m/min) | 40 | 30 |

Adhesion results are summarized in Table 6 below:

TABLE 6

| | | EX2-R | EX2 |
|---|---|---|---|
| Ink layers | | 1/2 | 1/2 |
| C 58 | High Gloss, Biaxially Oriented Polypropylene Film | 5/5 | 5/5 |
| PE | polyethylene | 5/5 | 5/5 |
| PET | polyeteneterephtalate | 4/4 | 5/5 |
| PVC | polyvinylchloride | 3/3 | 4/2 |
| MB 400 | Coextruded biaxially oriented PP film | 5/5 | 5/5 |
| MB 600 | Biaxially oriented PP film, acrylic coated | 5/5 | 5/5 |
| OPP NND 30 | One side treated, transparent OPP film | 5/5 | 5/5 |
| OPP GND 30 | GND is a transparent, two-side heat-sealable, one side treated OPP film | 5/5 | 5/5 |
| PET RNK 12 µm | polyeteneterephtalate | 4/2 | 1/0 |

TABLE 6-continued

|  |  | EX2-R | EX2 |
|---|---|---|---|
| PLA | Polylactic acid | 5/5 | 5/5 |
| PC | polycarbonate | 3/3 | 4/4 |

In conclusion: the performance of an ink based on a non chlorinated inert polyester containing isosorbide is comparable to that of an ink based on a chlorinated polyester resin that does not contain any isosorbide building blocks.

This was unexpected as chlorinated polyesters in general exhibit, besides a better adhesion, also relatively high cure speed in formulations due to abstraction of chlorine radicals by UV radiation.

Coatings

Coatings were prepared from resins of the invention and compared to coatings prepared from standard resins. The 20 μm coatings were prepared on paper and cured with a medium pressure mercury lamp (80 W/cm). For evaluation of the hardness, 40 μm films were made on glass and cured at the cure speed required for obtaining 50 acetone double rubs (ADR).

Results are summarized in Table 7 below.

TABLE 7

| Resin composition | Amount (in parts) | | | | | |
|---|---|---|---|---|---|---|
| EX1 | 80 |  |  |  |  |  |
| EX2 |  | 80 |  |  |  |  |
| EX3 |  |  | 80 |  |  |  |
| EX1-R |  |  |  | 80 |  |  |
| EX2-R |  |  |  |  | 80 |  |
| EX3-R |  |  |  |  |  | 80 |
| TPGDA | 20 |  | 20 | 20 |  | 20 |
| TMPTA |  | 20 |  |  | 20 |  |
| BCPK | 5 | 5 | 5 | 5 | 5 | 5 |
| Cure speed (m/min) | 20 | 45 | 20 | 15 | 40 | 2*5 |
| Persoz hardness (sec-) | 91 | 96 | 181 | 109 | 244 | 194 |

In conclusion: In clearcoats the isorsorbide-containing resins (including the non-chlorinated resins) cure faster than the commercial non isosorbide-containing countertypes, despite the fact that the hardness of the latter is higher.

The invention claimed is:

1. A radiation curable composition comprising at least one (meth)acrylated compound (A); and at least one inert OH-terminated polyester (B) that is prepared from a polyol component comprising at least one cyclic ether polyol and from a polyacid component, wherein said inert OH-terminated polyester (B) has a hydroxyl value of between 30 and 150 mg KOH/g.

2. The composition of claim 1, wherein said polyol component comprises from 5 to 100 wt % of cyclic ether polyols.

3. The composition of claim 1, wherein said polyol component comprises isosorbide as well as one or more of: as ethylene glycol, diethylene glycol and/or hydrogenated bisphenol A, and optionally neopentylglycol; and wherein the polyacid component comprises phthalic acid and/or phthalic anhydride.

4. The composition of claim 1, wherein the inert OH-terminated polyester (B) is further prepared from one or more mono-carboxylic compounds.

5. The composition of claim 4, wherein said mono-carboxylic compounds are selected from one or more of 2-(4-chlorobenzoyl) benzoic acid, o-benzoylbenzoic acid, 2-(4-phenylbenzoyl)benzoic acid, benzoic acid and substituted benzoic acid.

6. The composition of claim 4, wherein the hydroxyl value of the inert OH-terminated polyester (B) is between 30 and 120 mg KOH/g.

7. The composition of claim 1, comprising
at least one inert OH-terminated polyester (B) that is prepared from a polyol component comprising at least one cyclic ether polyol and from a polyacid component, and
at least one inert OH-terminated polyester (B) that is prepared from one or more mono-carboxylic compounds.

8. The composition of claim 1, wherein the inert OH-terminated polyester (B) has a number average molecular weight of between 500 and 5000 Daltons.

9. The composition of claim 1, wherein the (meth)acrylated compound (A) is a reactive diluent selected from di(meth)acrylates and/or tri(meth)acrylates.

10. The composition of claim 1 comprising at least 15% by weight of inert resins based upon the total weight of the composition, wherein the inert resins comprise the at least one inert OH-terminated polyester (B) and, optionally, other inert resins (C) that are different from the at least one inert OH-terminated polyester (B).

11. A coating composition, ink or varnish prepared from a composition according to claim 1.

12. An article coated, partially or entirely, with a composition according to claim 11.

13. A method comprising applying the composition according to claim 1 as a primer on metal or plastic and/or as an adhesion promoter for inks on a plastic.

14. A method comprising applying the inert OH-terminated polyester (B) of claim 1 as a primer on metal or plastic and/or as an adhesion promoter for inks on a plastic.

* * * * *